(12) United States Patent
Ma et al.

(10) Patent No.: US 9,774,673 B2
(45) Date of Patent: *Sep. 26, 2017

(54) METHOD AND SYSTEM FOR FEDERATED OVER-THE-TOP CONTENT DELIVERY

(71) Applicant: TELEFONAKTIEBOLAGET L M ERICSSON (PUBL), Stockholm (SE)

(72) Inventors: Kevin J. Ma, Nashua, NH (US); Raj Nair, Lexington, MA (US); Rob Hickey, Bedford, MA (US); Daniel Biagini, Bolton, MA (US); Chin-Cheng Wu, Carlisle, MA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/546,015

(22) Filed: Nov. 18, 2014

(65) Prior Publication Data

US 2015/0074831 A1    Mar. 12, 2015

Related U.S. Application Data

(60) Continuation of application No. 14/057,418, filed on Oct. 18, 2013, now Pat. No. 8,893,208, which is a
(Continued)

(51) Int. Cl.
*H04N 7/173* (2011.01)
*H04L 29/08* (2006.01)
(Continued)

(52) U.S. Cl.
CPC .......... *H04L 67/1095* (2013.01); *G06F 21/10* (2013.01); *H04L 67/02* (2013.01);
(Continued)

(58) Field of Classification Search
CPC . H04N 7/17318; H04N 7/17309; H04N 7/173
(Continued)

(56) References Cited

U.S. PATENT DOCUMENTS 6,034,956 A * 3/2000 Olnowich et al. ............ 370/388
6,035,207 A   3/2000 Wang et al.
(Continued)

OTHER PUBLICATIONS

Apostolopoulus, J., et al, "On Multiple Description Streaming With Content Delivery Networks," Streaming Media Systems Group, HP Laboratories, Palo Alto, CA, (c) 2004, IEEE, 10 pages.
(Continued)

*Primary Examiner* — Annan Shang

(57) ABSTRACT

A method is provided for managing over-the-top delivery of content through a plurality of content delivery networks (CDN). The method provided works transparently with standard HTTP servers supporting an initial request for content from a client to a first preferred CDN. If the first CDN does not have the content, the method includes provisions for the first CDN to acquire the content from a second CDN, or for the client to request the content from a second CDN directly. A system is also specified for implementing a client and server infrastructure in accordance with the provisions of the method.

20 Claims, 4 Drawing Sheets

Related U.S. Application Data division of application No. 13/422,272, filed on Mar. 16, 2012, now Pat. No. 8,589,996.

(60) Provisional application No. 61/453,370, filed on Mar. 16, 2011.

(51) Int. Cl.

| | | |
|---|---|---|
| *H04N 21/218* | (2011.01) | |
| *H04N 21/231* | (2011.01) | |
| *H04N 21/2343* | (2011.01) | |
| *H04N 21/462* | (2011.01) | |
| *H04N 21/647* | (2011.01) | |
| *H04N 21/845* | (2011.01) | |
| *G06F 21/10* | (2013.01) | |
| H04N 21/2347 | (2011.01) | |
| H04N 21/61 | (2011.01) | |

(52) U.S. Cl.
CPC ... *H04N 21/2181* (2013.01); *H04N 21/23103* (2013.01); *H04N 21/23106* (2013.01); *H04N 21/23439* (2013.01); *H04N 21/4622* (2013.01); *H04N 21/64738* (2013.01); *H04N 21/8456* (2013.01); *H04N 21/2347* (2013.01); *H04N 21/6175* (2013.01)

(58) Field of Classification Search
USPC .............................. 725/86–118; 709/217–232
See application file for complete search history.

(56) References Cited

U.S. PATENT DOCUMENTS

| | | | | |
|---|---|---|---|---|
| 6,075,796 | A | * | 6/2000 | Katseff et al. ................ 370/466 |
| 7,164,656 | B2 | * | 1/2007 | Foster et al. ................. 370/235 |
| 7,551,926 | B2 | | 6/2009 | Rune |
| 2006/0168275 | A1 | | 7/2006 | Lin et al. |
| 2007/0124779 | A1 | | 5/2007 | Casey et al. |
| 2008/0059631 | A1 | * | 3/2008 | Bergstrom ......... H04N 7/17318 709/224 |
| 2010/0045868 | A1 | | 2/2010 | Kim |
| 2012/0047542 | A1 | | 2/2012 | Lewis et al. |
| 2012/0095910 | A1 | * | 4/2012 | Nathan ................. G06Q 20/10 705/39 |
| 2012/0185370 | A1 | | 7/2012 | Davie et al. |

OTHER PUBLICATIONS

Guo, et al.: "Selecting Path-Diversified Servers in Content Distribution Networks". GlobeCon 2003. 5 pages.

Nguyen, T., et al.: "Multiple Sender Distributed Video Streaming". Transaction on Multimedia, IEEE vol. 6, No. 2, Apr. 2004. 12 pages.

Pantos, et al.: "HTTP Live Streaming: http://tools.ietf.org/html/draft-pantos-http-live-streaming-05," Apple Inc., Nov. 19, 2010. 22 pages.

Jacobsen, et al.: "Networking Named Content". http://conferences.sigcomm.org/co-next/2009/papers/Jacobson.pdf Palo Alto Research Center. 12 pages.

Niven-Jenkins, et al.: "Content Distribution Network Interconnection (CDNI) Problem Statement". http://tools.ietf.org/html/draft-jenkins-cdni-problem-statement-01. Verizon, Jan. 17, 2011. 33 pages.

Ma, et al.: "Content Distribution Network Interconnection (CDNI) Publisher Use Cases". http://tools.ietf.org/html/draft-ma-cdni-publisher-use-cases-00. Mar. 7, 2011. 14 pages.

Seedorf, et al.: "Application-Layer Traffic Optimization (ALTO) Problem Statement". http://toools.ietf.org/html/rfc5693. Neustar Inc. Oct. 2009. 14 pages.

Zambelli: "Alex Zambelli's Microsoft Media Blog, Microsoft Media Platform, streaming video, Smooth Streaming, h.264, VC-1, Silverlight, Windows Media". 21 pages. htt://alexzambelli.com/blog/2009/02/10/smooth-streaming-architecture/.

\* cited by examiner

METHOD AND SYSTEM FOR FEDERATED OVER-THE-TOP CONTENT DELIVERY

PRIORITY

This application is a continuation of U.S. patent application Ser. No. 14/057,418 filed on Oct. 18, 2013 which is a divisional of U.S. application Ser. No. 13/422,272 (U.S. Pat. No. 8,589,996) filed on Mar. 16, 2012 which claims priority to Provisional Application No. 61/453,370 filed on Mar. 16, 2011. The content of these documents are incorporated within.

BACKGROUND

This invention relates in general to over-the-top (OTT) media delivery and more specifically to managing multi-source streaming media.

Content providers (CPs) typically create content (e.g., movies, television shows, webcasts, etc.) and license the distribution rights to network service providers, e.g., mobile network operators (MNOs) and multiple system operators (MSOs). There is a clear delineation between content production and content distribution in this model. The move toward Web-based delivery of content, over the public Internet, has shifted the paradigm for content delivery. Traditional service provider broadcast networks are being bypassed, and content publishers, content aggregators, and content service providers (all referred to herein as content providers) deliver content directly to consumers using generic data channels. This new paradigm, a non-broadcast, non-streaming approach which uses generic on-demand data connections rather than legacy multicast distribution infrastructure, is referred to as over-the-top or OTT delivery. OTT delivery affords greater control to CPs, but requires the CPs to manage content distribution. CPs may utilize content delivery networks (CDNs) to provide a distribution channel for OTT delivery. CDNs may be run by MNOs or MSOs, or by independent network service providers.

SUMMARY

Among the challenges faced by content providers in using content delivery networks (CDNs), one is the possibility that a given CDN may not have the necessary geographic footprint or network capacity to service all clients wishing to retrieve content. It may be necessary to employ multiple CDNs to adequately support content delivery. The management of these distribution channels requires new methods of interaction.

Methods and apparatus are disclosed for managing a plurality of CDNs to optimize OTT content delivery to client devices. A workflow management system, referred to herein as a workflow manager (WFM), is responsible for managing the acquisition of source content from a content management system (CMS), preparation of the content, including, but not limited to, transcoding of the content into different encodings (e.g., different bitrates, frame rates, resolutions, sample rates, codecs, etc.), storing the transcoded content in different formats (e.g., 3GP, MP4, fragmented MP4, MPEG-TS, segmented MPEG-TS, RTP, etc.), and encrypting the different formats, so that the content is suitable for delivery to a plurality of client devices over a plurality of network infrastructures. The prepared content is then uploaded to a plurality of CDNs. Included are provisions for managing which content is distributed through a given CDN, and prioritizing which clients retrieve content through a given CDN.

A method is provided for uploading content to a plurality of CDNs, managing delegation of delivery between CDNs, monitoring the performance of content delivery by each CDN, and providing clients with CDN retrieval information. A separate method is provided for client devices to measure and report the performance of content delivered, and manage the retrieval of content based on CDN performance metrics. A system is also specified for implementing a client and server infrastructure in accordance with the provisions of the method. The system includes a WFM server for preparing and uploading content to a plurality of CDNs. The system further includes a client for communicating with the WFM to determine where to retrieve content from and to provide feedback on CDN delivery performance.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
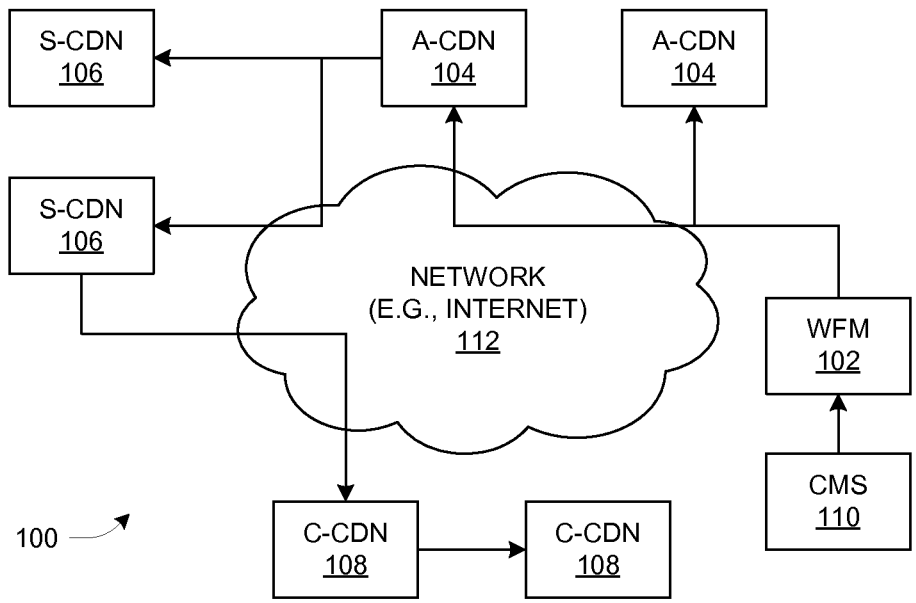
FIG. 1 is a block diagram of a system which is capable of conducting content management procedures, in accordance with various embodiments of the invention.

FIG. 1 shows a system 100 for one embodiment of the present invention. A workflow manager (WFM) 102 is responsible for acquiring source content from a content management system (CMS) 110 and preparing the content for distribution. In one embodiment, preparation includes transcoding audio and video into a plurality of encodings using different codecs, bitrates, frame rates, sample rates, and resolutions. The transcoded content is then written into a plurality of output files. In one embodiment, a plurality of output files contain the same transcoded content encapsulated in different container formats (e.g., 3GP, MP4, MPEG-TS, WMV, MOV, etc.). In one embodiment, the prepared output files are segmented into fixed duration segment files (e.g., MPEG-TS segments, fragmented MP4 segments, 3GP DASH segments, etc.). In one embodiment, the output files, both segmented and un-segmented, are encrypted using standard encryption protocols (e.g., AES-128, HC-128, RC4, etc.).

In FIG. 1 as well as elsewhere herein, components that are depicted are to be understood as one or more computers each having a hardware implementation in a known manner using one or more processors, memory, input/output circuitry and one or more high-speed data buses interconnecting these items together for data transfer therebetween. The computers include computer program instructions executed by the processor(s) that customize the computers to implement desired functionality. Examples in FIG. 1 include the WFM 102 and CMS 110. CDNs such as CDNs 104, 106 and 108 are collections of computers networked together as briefly described below.

The WFM 102 uploads the output files, both segmented and un-segmented, to a plurality of authoritative CDNs (A-CDNs) 104. The A-CDNs 104 are explicitly specified by content providers (CPs) as the primary distribution CDNs for the content. The A-CDNs 104 receive content uploads directly from the WFM 102. The A-CDNs 104 also act as origin CDNs for CDN delegation. The WFM 102 may also configure surrogate CDNs (S-CDNs) 106, which do not receive direct uploads from the WFM 102, but rather acquire content from an origin CDN, i.e., an A-CDN 104. The S-CDNs 106 are contracted by the content provider but do not receive uploads directly from the WFM 102. Cascaded CDNs (C-CDNs) 108 are similar to S-CDNs 106 in that they do not receive uploads directly from the WFM 102. However, rather than acquiring the content from an A-CDN 104, C-CDNs acquire content from S-CDNs 106 or other C-CDNs 108.

FIG. 1 shows connections or communications paths as lines between components, with some lines extending through a network 112 such as the public Internet. It will be understood that such connections may be carried by the network 112, whereas connections shown as lines directly between components may be more direct, private connections such as those of a local-area network, for example. The collection of CDNs 104, 106 and/or 108 in any particular embodiment may be referred to as a "federation" of CDNs. As generally known in the art, a CDN is a networked system of computers used for delivering content to a (usually large) number of endpoints or clients. It is noted that there are existing commercial CDN vendors and implementations which may be used in some embodiments of the invention, but the presently disclosed techniques are not limited to such CDNs. In a broad sense, a CDN includes any set of storage (caching) devices, and a federation of CDNs are arranged hierarchically to distribute content. Each CDN may have further levels of request routing which are used to select the exact storage (caching) device that will service a given request. The inter-CDN selection described herein does not preclude further intra-CDN request routing being performed by individual CDNs. CDNs may consist of an aggregation of smaller CDNs. The CDN selection described herein may be applied at any level of the CDN aggregation.

In one embodiment, all CDNs are A-CDNs 104. The WFM 102 uploads the prepared output files for each source content item to every CDN in the federation. This allows the WFM 102 to guarantee that the content is available in each CDN. Given N CDNs, B bytes of prepared output files for each source content item (on average), and X source content items, the total upload capacity required is (N*X*B) bytes.

In another embodiment, all CDNs act as both A-CDNs 104 and S-CDNs 106, and different CDNs play different roles for different source content items. The WFM 102 uploads all of the prepared output files for a single source content item to only a specific single A-CDN 104. All other CDNs act as S-CDNs 106 for that source content item, and acquire the prepared output files for that source content item from the specific single A-CDN 104. The prepared output files for different source content items are uploaded to different A-CDNs 104. The WFM 102 load balances the uploads for different content items to the different CDNs. Given N CDNs, B bytes of prepared output files for each source content item (on average), and X source content items, the total upload capacity required is (X*B) bytes. For live streaming content, this provides a significant benefit as upload bandwidth is typically limited.

For an embodiment of the above type, the WFM 102 specifies to the A-CDNs 104 that delegation to S-CDNs 106 is authorized. In one embodiment, the authorization is implicit through the configuration of the S-CDNs 106. In another embodiment, the authorization is issued through a CDN control protocol (e.g., CDNI Control APIs). The WFM 102 also configures the S-CDNs 106 to point at the A-CDN 104 to acquire the prepared output files. In one embodiment, directory structures used in the A-CDN 104 and S-CDNs 106 are identical; only the DNS information and IP address of the CDNs differ. The prepared output files for different source content items are stored in different directories. The CDN origin server is specified on a per-directory basis. For A-CDNs 104, the origin server is configured to be the local CDN storage device that the WFM 102 uploaded the prepared output files to. For S-CDNs 106, the origin server is configured to be the A-CDN 104. CDN origin server configuration is typically performed through Web-based or Web Service-based APIs, as should be known to those skilled in the art.

In another embodiment, all CDNs may act as either A-CDNs 104, S-CDNs 106, or both, and the WFM 102 uploads all of the prepared output files for a single source content item to a subset of all CDNs. In one embodiment, the A-CDNs 104 are selected based on geographic location, where the A-CDNs 104 are geographically dispersed. All non-A-CDNs 104 act as S-CDNs 106. In one embodiment, the S-CDNs 106 are configured to use the closest physical A-CDN 104 as their origin server. The S-CDNs 106 are also configured with the alternate A-CDNs 104 which are also acting as origin servers for the source content item. This provides A-CDN 104 redundancy for the S-CDNs 106. In the event of a failure of the primary A-CDN 104, the S-CDN 106 may use an alternate A-CDN 104 as an origin server. Given N CDNs, with M CDNs designated as A-CDNs 104, B bytes of prepared output files for each source content item (on average), and X source content items, the total upload capacity required is (M*X*B) bytes where M<N.

The WFM 102 specifies to the A-CDNs 104 that delegation to those S-CDNs 106 which have configured that A-CDN 106 as their origin server is authorized. In one embodiment, the authorization is implicit through the configuration of the S-CDNs 106. In another embodiment, the authorization is issued through a CDN control protocol (e.g., CDNI Control APIs). The WFM 102 also configures the S-CDNs 106 to point at the A-CDN 104 to acquire the prepared output files. In one embodiment, the directory structures in the A-CDN 104 and S-CDNs 106 are the same;

only the DNS and IP address of the CDNs differ. The prepared output files for different given source content items are stored in different directories. The CDN origin server is specified on a per-directory basis. For A-CDNs 104, the origin server is configured to be the local CDN storage device that the WFM 102 uploaded the prepared output files to. CDN origin server configuration is typically performed through Web-based or Web Service-based APIs, as should be known to those skilled in the art.

In another embodiment, the CDNs initially contracted by the WFM 102 may provide insufficient coverage and/or capacity to meet client content retrieval demand. Additional CDNs may be added to increase geographic footprint or to increase raw delivery capacity (i.e., bandwidth). The re-preparation of media is typically infeasible due to the extensive resources required. When bringing on a new CDN, the new CDN may be either an S-CDN 106 or C-CDN 108, depending on which existing CDN is configured as the origin server for the new CDN, i.e., an A-CDN 104 or a different S-CDN 106, respectively. In one embodiment, the selection of which CDN to configure as the origin server is based on physical proximity (i.e., the nearest existing CDN is chosen). In another embodiment, this selection is based on business rules such as delivery charges (i.e., the CDN with the lowest delivery fees is chosen), while in another embodiment it is based on capacity (i.e., the CDN with the highest excess/unused delivery capacity is chosen).

The WFM 102 keeps track of all CDNs which have obtained or have access to the content. The WFM 102 directs client requests for content to an appropriate CDN. In one embodiment, the WFM 102 enforces temporal-based content licensing and removes content from all CDNs once the content has expired. In one embodiment, the WFM 102 enforces geo-location based licensing and only serves specific content to clients within a defined geo-footprint. In one embodiment, the WFM 102 enforces network service provider-based licensing and only serves specific content to clients accessing the content through a defined set of network service provider access networks. In one embodiment, the WFM 102 enforces subscription-based licensing and only serves a subset of content to clients which have authenticated using specific user credentials.

Figure 2:
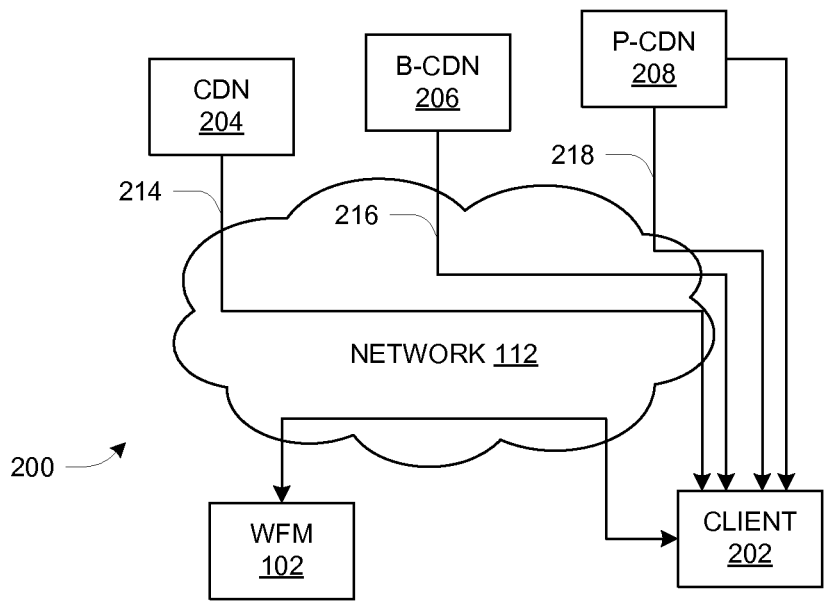
FIG. 2 is another block diagram of a system which is capable of conducting content delivery procedures, in accordance with various embodiments of the invention.

FIG. 2 shows a system 200 for one embodiment of the present invention. A client device or client 202 issues a content playback request using a unique identifier (UID) associated with the source content to the WFM 102. In one embodiment, the client 202 provides user information (e.g., username) to the WFM 102, in the content playback request. In one embodiment, the client 202 provides geo-location information (e.g., GPS coordinates) to the WFM 102, in the content playback request. In one embodiment, the client 202 provides device information (e.g., user agent, or capabilities string), to the WFM 102, in the content playback request.

The WFM 102 looks up the content and determines which CDNs the content is available through. In one embodiment, the WFM 102 uses the user information provided by the client 202 to filter the content lookup preventing the client 202 from viewing content for which the user does not have rights. In one embodiment, the WFM 102 uses the device information provided by the client 202 to filter the content lookup preventing the client 202 from retrieving content that is not properly formatted for the client device. The WFM 102 compiles a list of CDNs which contain the requested content properly formatted for the client 202 device. In one embodiment, the list is prioritized based on feedback from previous clients 202 that have requested and retrieved the content, as described further below. In one embodiment, the WFM 102 uses geo-location information provided by the client 202 to further prioritize the list of CDNs.

The client 202 takes the prioritized list of CDNs provided by the WFM 102 and selects the K highest priority CDNs (e.g., K=3). The client 202 issues requests for the first K segments of data to the K highest priority CDNs, using one of two request distribution methods described below. In one embodiment, segment requests are requests for segment files generated by pre-segmenting a larger file. In another embodiment, segment requests are performed by issuing HTTP range gets for respective portions of one larger file.

In one embodiment, the client 202 retrieves the first segment from each of the K CDNs 204, 206, and 208 in parallel. The response latency is measured for each of the CDN responses 214, 216, and 218. The CDN which responds the fastest is selected as the primary CDN (P-CDN) 208. The remaining segments are retrieved by client 202 from the P-CDN 208. The other requests 214 and 216 are allowed to return the initial portion of the segment, in order to determine the response latencies for CDNs 204 and 206, respectively. The requests 214 and 216 are then aborted to avoid unnecessary bandwidth usage. In one embodiment, the initial requests are for only a portion of the initial segment (e.g., using the HTTP HEAD method, or an HTTP Range request), to further reduce unnecessary bandwidth usage. In one embodiment, only the highest priority CDN, as specified by the WFM 102, is issued a request for full segment retrieval. The CDN which responds second fastest is selected as the backup CDN (B-CDN) 206. The client 202 will begin retrieving segments from the B-CDN 206 if a failure occurs in retrieving segments from the P-CDN 208. The response latencies for all K CDNs are reported to the WFM 102. In one embodiment, geo-location information is included in the CDN latency report sent to the WFM 102, by the client 202. In one embodiment, timestamp information is included in the CDN latency report sent to the WFM 102, by the client 202.

In another embodiment, the client 202 retrieves the first segment from the highest priority CDN, the second segment from the second highest priority CDN, and so on, for the first K segments and K CDNs. In one embodiment, the first K requests are issued in serial to the K CDNs 204, 206, and 208. In another embodiment, the first K requests are issued in parallel to the K CDNs 204, 206, and 208. All K responses 214, 216, and 218 are allowed to complete, and all K segments are used for playback. The latency and throughput of each response 214, 216, and 218 are measured. In one embodiment, the CDN with the highest measured throughput is selected as the primary CDN (P-CDN) 208. In another embodiment, the CDN with the highest measured throughput, weighted by the normalized latency, is selected as the primary CDN (P-CDN) 208. The remaining segments are retrieved by client 202 from the P-CDN 208. The CDN with the second highest measured throughput is selected as the backup CDN (B-CDN) 206. The client 202 will begin retrieving segments from the B-CDN 206 if a failure occurs in retrieving segments from the P-CDN 208. The measured latencies and throughputs for all K CDNs are reported to the WFM 102. In one embodiment, geo-location information is included in the CDN throughput report sent to the WFM 102, by the client 202. In one embodiment, timestamp information is included in the CDN latency report sent to the WFM 102, by the client 202.

Figure 3:
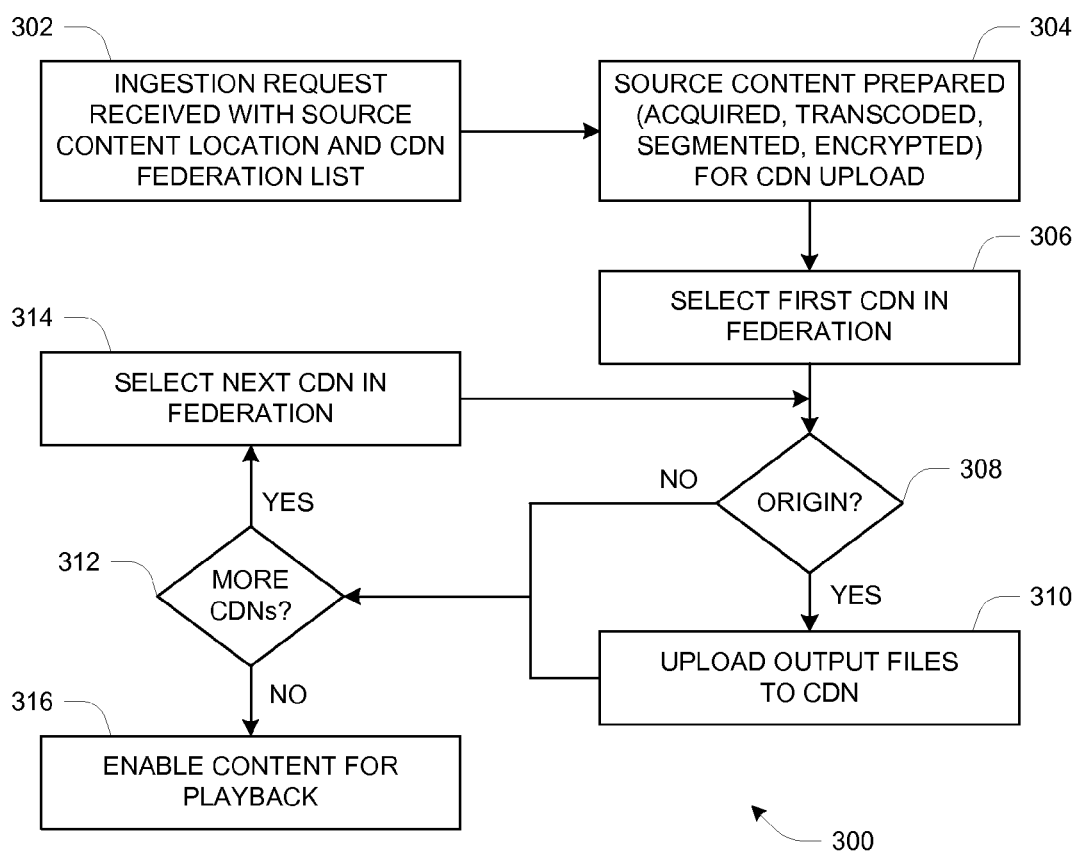
FIG. 3 is a flow chart showing a method for performing content management, in accordance with an embodiment of the present invention.

FIG. 3 shows a process 300 for uploading prepared output files to a CDN federation. In step 302, the WFM 102 receives an ingestion request from a CMS 110. In one embodiment, the request is an HTTP POST of XML data containing information including, but not limited to, transcode parameters, segmentation parameters, encryption parameters, source content location, CDN parameters, and a CDN federation list. In one embodiment, the WFM 102 may have predefined profiles for media preparation and CDN upload which are referenced in the ingestion request. In one embodiment, the CDN federation list includes a list of CDNs as well as designations on which CDNs should be used as A-CDNs 104. In another embodiment, the CDN federation list includes a flag denoting that A-CDN load balancing should be used and that the WFM 102 should select an A-CDN 104. In one embodiment, the load balanced A-CDN selection uses random selection to determine the A-CDN 104. In another embodiment, the load balanced A-CDN selection uses weighted random selection to determine the A-CDN 104, with weights configured a priori by the content provider. In another embodiment, the load balanced A-CDN selection uses round robin selection to determine the A-CDN 104, with state stored in the WFM 102. In another embodiment, the load balanced A-CDN selection uses weighted round robin selection to determine the A-CDN 104, with weights configured a priori by the content provider and state stored in the WFM 102.

Processing continues to step 304 where the media (source content) preparation is performed, including, but not limited to, transcoding, segmentation, and encryption. Processing then continues to step 306 where CDN upload begins. In one embodiment, media preparation is performed to completion before CDN upload begins. In another embodiment, media preparation is pipelined with CDN upload such that segments are uploaded as they become available, in order to reduce upload latency. In steps 306-314, the entire CDN federation list is processed. In step 306 the first CDN in the federation is selected and processing continues to step 308 where a check is performed to see if the CDN is designated to be an origin CDN, i.e., an A-CDN 104. If the CDN is not an A-CDN 104, processing continues to step 312. If the CDN is an A-CDN 104, processing continues to step 310 where the content is uploaded, then proceeds to step 312. In step 312, the CDN federation list is checked to see if any unprocessed CDNs remain. If more CDNs remain to be processed, processing continues to step 314 where the next CDN in the list is selected. Processing then proceeds back to step 308 where the next CDN is processed. If no more CDNs remain to be processed, in step 312, processing continues to step 316 where the media preparation is declared complete and the content is enabled for playback. Though steps 306-314 suggest a serialized process in flow 300, it should be understood that the individual uploads to different CDNs performed in step 310 may occur in parallel with the processing of subsequent uploads to other CDNs. In one embodiment, a callback is issued in step 316 to notify the CMS 110 that processing has completed. In one embodiment, the callback is an HTTP POST containing XML data with information on the output files generated from media preparation.

Figure 4:
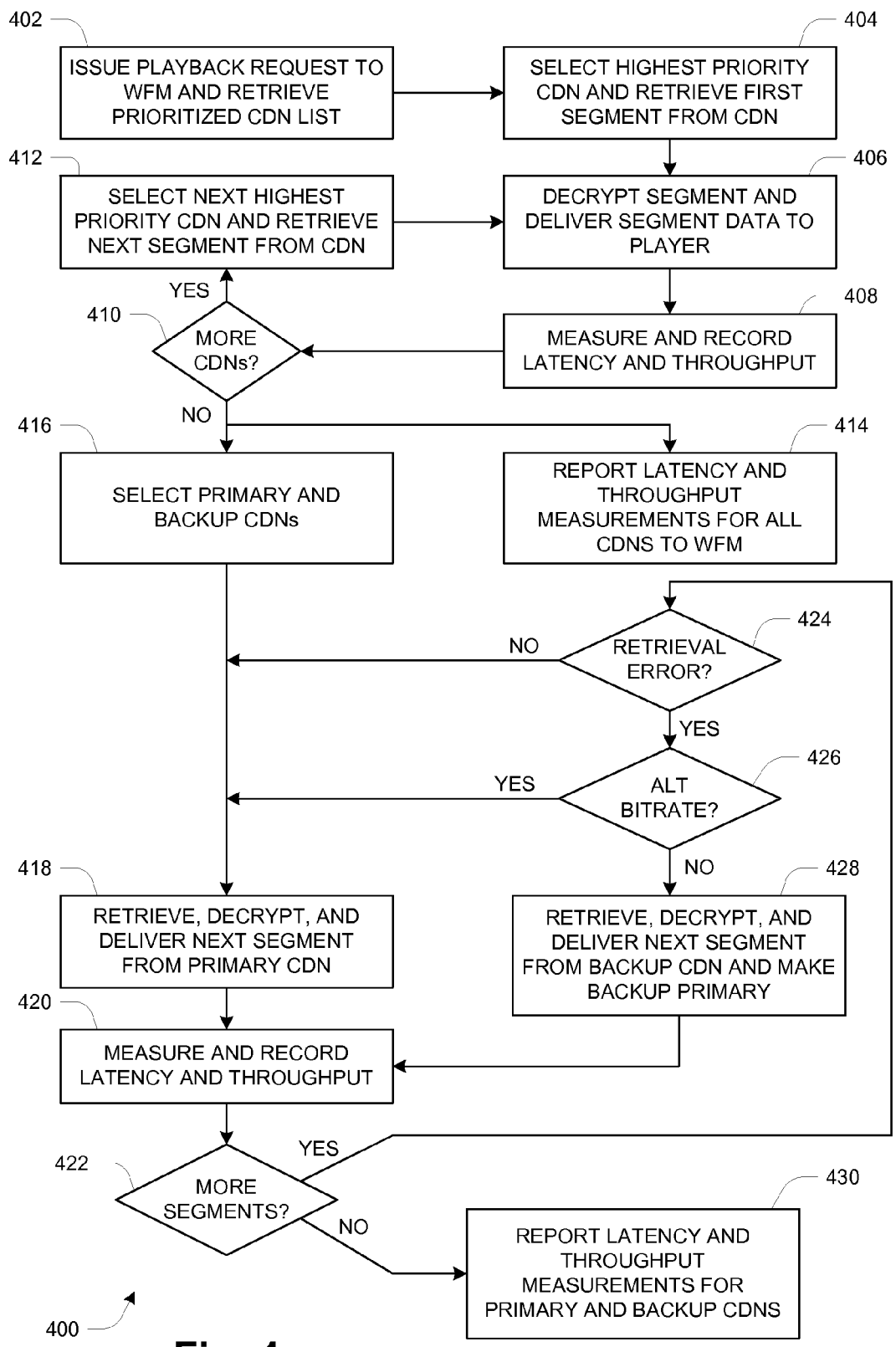
FIG. 4 is a flow chart showing a method for performing content distribution, in accordance with an embodiment of the present invention.

FIG. 4 shows a process 400 for retrieving prepared output files from a CDN federation. In step 402, the client 202 issues a playback request to the WFM 102. The WFM 102 generates a response as through the process described below with respect to a flow 500. The response includes, among other details, a prioritized list of CDNs participating in the federation to deliver the requested media. In one embodiment, the response also includes cipher information, decryption key information, and initialization vector information for use in decrypting the segment data. In one embodiment, the response also includes container format information for use in parsing the segment data. In one embodiment, the response also includes audio and video codec, frame rate, sample rate, and resolution information for use in initializing the local media player of the client 202.

The processing of the CDN federation list by the client 202 takes place in steps 404-416. In step 404, the first, highest priority CDN is selected from the CDN federation list and a request for the first segment is issued to that CDN. Processing then continues to step 406 where the segment is processed before being handed to the media player of the client 202. In one embodiment, the segment is decrypted using a content decryption key provided by the WFM 102 in step 402. Numerous algorithms exist for the encryption of data (e.g., AES-128 ECB, AES-128 CBC, AES-128 CTR, HC-128, RC4, etc.), as should be known to those skilled in the art. Any valid encryption algorithm could be used (decryption performed by the segment processing in step 426 described below). The decryption key and initialization vector included with the playback information received in step 402 is used to initialize the cipher specified in the playback information received in step 402 and decrypt the data. The decryption methods for specific ciphers should be known to those skilled in the art. In one embodiment, the decrypted segment is parsed to extract individual video frames and audio sample data to feed directly to a local media player. Audio and video data may be encapsulated in a multitude of container formats (e.g., MPEG-TS, RTP, 3GP, etc.), including proprietary formats, as should be known to those skilled in the art. Any valid container format could be supported by the segment processing in step 406.

Once the segment download is complete, processing continues to step 408 where the download latency and throughput are calculated and stored in persistent memory. Processing then continues to step 410 where the client 202 checks to see if any more CDNs remain to be evaluated. In one embodiment, all CDNs in the CDN federation list provided by the WFM 102 are processed. In another embodiment, only the top K CDNs are processed. If more CDNs remain to be processed, processing continues to step 412 where the next highest priority CDN is chosen from the CDN federation list and a request for the next sequential segment to be retrieved is sent to that CDN. Once the segment has been retrieved, processing proceeds back to step 406 where the segment is processed and evaluated. If no more CDNs remain to be processed in step 410, processing continues to steps 414 and 416. Though steps 406-412 suggest a serialized process in flow 400, it should be understood that individual requests to each CDN in the CDN federation list may be issued in parallel and that the processing performed in steps 408 and 410 may occur asynchronously, as should be familiar to those skilled in the art. Continuation to steps 414 and 416 is gated on the completion of all outstanding parallel requests issued in steps 406 and 412, regardless of the order in which they complete.

From step 410, steps 414 and 416 occur in parallel. In step 414, the recorded latency and throughput measurements for each of the CDNs processed in step 408 are compiled into a single message that is sent to the WFM 102. In one embodiment, the message is an HTTP POST of XML formatted data. In step 416, primary and backup CDNs are selected. The CDNs that were processed in steps 406-412 are prioritized based on the recorded latency and throughput measurements from step 408. The CDNs are ranked from highest to lowest throughput. CDNs which were not processed in steps 406-412 are given a latency of zero and a throughput of zero, placing them at the bottom of the list. CDNs with equal throughputs are sub-ranked based on latency measurements. CDNs with equal latencies and throughputs are sub-ranked based on priorities originally assigned by the WFM 102. From the newly prioritized list, the highest priority CDN is selected as the primary CDN for retrieving the remainder of the segments. In one embodiment, the second highest priority CDN from the newly prioritized list is selected as the backup CDN. In another embodiment, the backup CDN is chosen at random. In another embodiment, the backup CDN is chosen based solely on the priorities originally assigned by the WFM 102. In one embodiment, only a single backup CDN is selected. In another embodiment, all CDNs are eligible to be backup CDNs. If the need arises for multiple backup CDNs, each CDN is used in its priority order.

Once the primary and backup CDNs have been chosen, processing continues to step 418. Retrieval of the remaining segments occurs in steps 418-428. In step 418, the next segment is downloaded from the primary CDN and then processed and delivered to the media player for rendering. In one embodiment, the segment is decrypted using the content decryption key provided by the WFM 102 in step 402. Numerous algorithms exist for the encryption of data (e.g., AES-128 ECB, AES-128 CBC, AES-128 CTR, HC-128, RC4, etc.), as should be known to those skilled in the art. Any valid encryption algorithm could be used by the segment processing in step 418. The decryption key and initialization vector included with the playback information received in step 402 is used to initialize the cipher specified in the playback information received in step 402 and decrypt the data. The decryption methods for specific ciphers should be known to those skilled in the art. In one embodiment, the decrypted segment is parsed to extract individual video frames and audio sample data to feed directly to a local media player. Audio and video data may be encapsulated in a multitude of container formats (e.g., MPEG-TS, RTP, 3GP, etc.), including proprietary formats, as should be known to those skilled in the art. Any valid container format could be supported by the segment processing in step 418.

Processing continues to step 420 where the download latency and throughput are calculated for the current primary CDN and stored in persistent memory. Processing then continues to step 422 where the client 202 checks to see if any more segments remain to be retrieved. If more segments remain to be retrieved, processing continues to step 424 where a check is performed to determine if a segment retrieval error has occurred. If no segment retrieval error has occurred, processing proceeds back to step 418 where the next segment is retrieved and processed from the primary CDN. If a segment retrieval error had occurred and was detected in step 424, processing continues to step 426 where a check is performed to determine if an alternate bitrate segment is available on the primary CDN. In one embodiment, the alternate bitrate must be lower than the bitrate of the failed retrieval. If an alternate bitrate exists, then processing proceeds back to step 418 where the next segment, in the newly selected bitrate, is retrieved and processed from the primary CDN.

If no suitable alternate bitrate was found in step 426, processing continues to step 428, where the client 202 falls back to the backup CDN selected in step 416. In one embodiment, the next segment is downloaded from the highest priority backup CDN and then processed and delivered to the media player for rendering. The primary CDN is demoted to the lowest priority backup CDN, while the highest priority backup CDN is promoted to be the new primary CDN. In this embodiment, repeated processing through step 428 cycles through the CDN list in a round robin fashion, each iteration selecting the next CDN in the prioritized ordering. In another embodiment, the demotion of the primary CDN in step 428 is reprioritized using the priorities originally assigned by the WFM 102. From step 428 processing proceeds back to step 420.

In one embodiment, decryption of the segment in step 428 is done using the content decryption key provided by the WFM 102 in step 402. Numerous algorithms exist for the encryption of data (e.g., AES-128 ECB, AES-128 CBC, AES-128 CTR, HC-128, RC4, etc.), as should be known to those skilled in the art. Any valid encryption algorithm could be used by the segment processing in step 426. The decryption key and initialization vector included with the playback information received in step 402 is used to initialize the cipher specified in the playback information received in step 402 and decrypt the data. The decryption methods for specific ciphers should be known to those skilled in the art. In one embodiment, the decrypted segment is parsed to extract individual video frames and audio sample data to feed directly to a local media player. Audio and video data may be encapsulated in a multitude of container formats (e.g., MPEG-TS, RTP, 3GP, etc.), including proprietary formats, as should be known to those skilled in the art. Any valid container format could be supported by the segment processing in step 426.

Once all segments have been retrieved and processed, the check in step 422 will fail (no more segments) and processing will continue to step 430. In step 430, the recorded latency and throughput measurements for each segment processed (and the CDN from which it was retrieved) in step 420 are compiled into a single message that is sent to the WFM 102. In one embodiment, the message is an HTTP POST of XML formatted data. In one embodiment, each individual throughput sample is sent to the WFM 102. In another embodiment, the throughput data is digested into a single throughput value per CDN. In one embodiment, each individual latency sample is sent to the WFM 102. In another embodiment, the latency data is digested into a single latency value per CDN. In one embodiment, the single values per CDN are simple arithmetic means. In another embodiment, the single values per CDN are time weighted means whereby the weighted value of a given measurement exponentially decreases over time. These messages may be referred to as "statistics" or "analytics" messages elsewhere herein.

In one embodiment, client location information describing a geographic location of client 202 (e.g., via GPS coordinates) is associated with each segment's latency and throughput measurements and is included in the statistics message delivered at 430. In one embodiment, timestamp information for the requests for the segments is also associated with each segment's latency and throughput measurement and included in the statistics message. Time and location information may be used to enable correlation of retrieval failures with specific location and mobility events.

Figure 5:
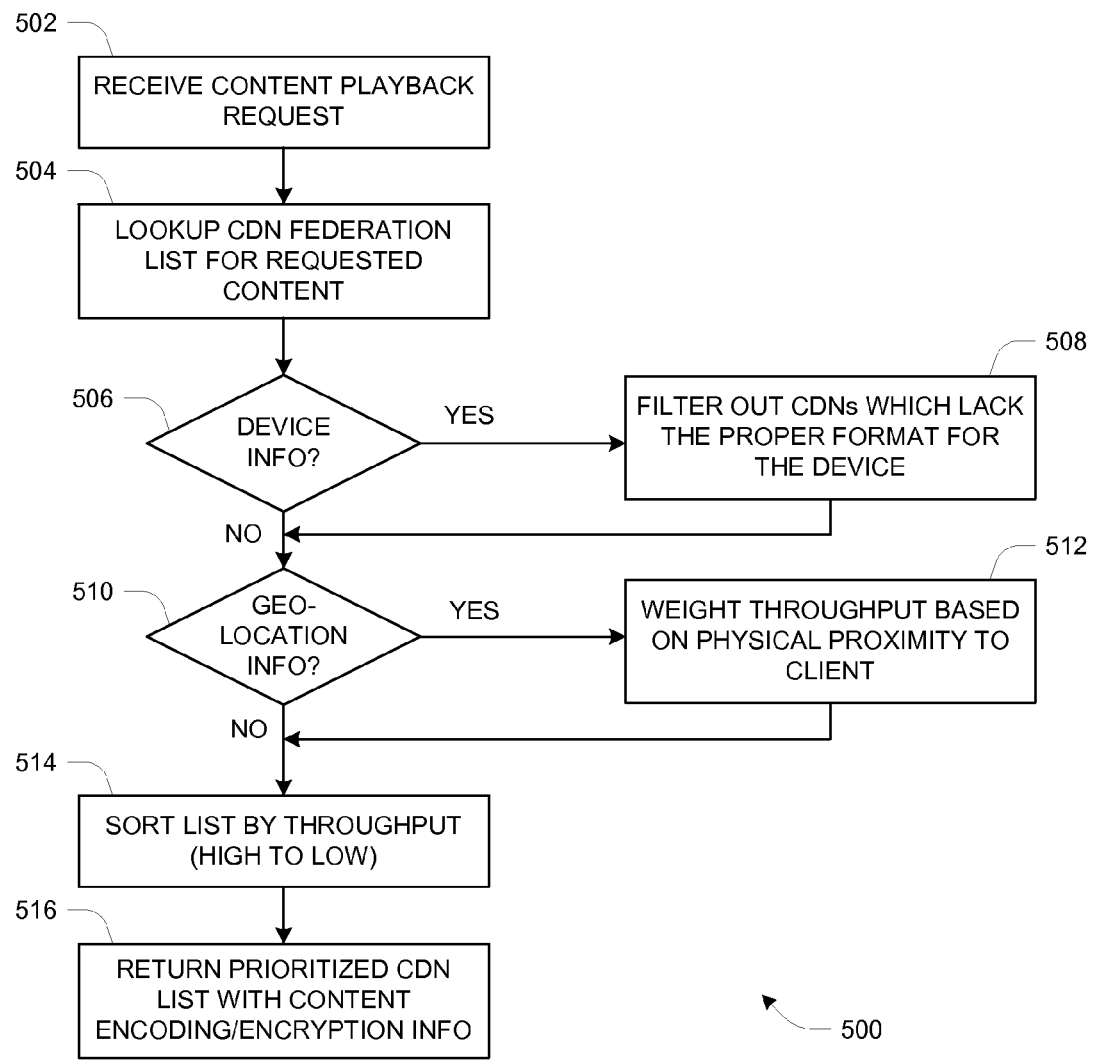
FIG. 5 is a flow chart showing a method for performing CDN prioritization, in accordance with an embodiment of the present invention.

FIG. 5 is a flow chart 500 describing a process for prioritizing CDNs within a federation. In step 502, the WFM 102 receives a playback request from the client 202 for a specific piece of content. Processing continues to step 504 where the WFM looks up the CDN federation list associated with the content. The CDN federation list was provided to the WFM 102 by the CMS 110 in the media ingestion request processed in flow 300. Processing continues to step 506 where the WFM 102 checks to see if the client 202 provided device information in the playback request. If the client 202 did not provide device information, processing proceeds directly to step 510. If the client 202 provided device information, processing continues to step 508 where the CDN federation list is filtered, removing any CDNs which do not have content in the correct format for the device, before proceeding to step 510. Detection of device capabilities (e.g., codec support, screen resolution, CPU resources, memory resources, network resources, etc.) should be known to those skilled in the art.

In step 510, the WFM 102 checks to see if the client 202 provided geo-location information in the playback request. If the client 202 did not provide geo-location information, processing proceeds directly to step 514. If the client 202 provided geo-location information, processing continues to step 512 where the CDN priority values are weighted based on the proximity of the CDN to the current location of the client 202, before proceeding to step 514. In one embodiment, physical proximity is used to prioritize the CDN list.

In one embodiment, the proximity calculation uses the minimum distance between a point representing the client 202 and a group of points representing points-of-presence for the CDN. In another embodiment, the proximity calculation uses the minimum tangential distance between a point representing the client 202 and a convex hull representing the CDN footprint. There are multiple methods for calculating physical proximity, as should be known to those skilled in the art. Any method for calculating physical proximity would be suitable for use in step 512. In one embodiment, the weighting values in step 512 are normalized to a logarithmic scale generating penalty percentages to be applied to the throughput values stored for each CDN.

In step 514, the weighted throughput values are sorted generating the priority order for the CDNs. Processing then continues to step 516 where the sorted list of CDNs within the federation is returned to the client 202, along with other necessary information required for rendering the content.

In some embodiments, temporal proximity may be used to augment the CDN list prioritization. In one embodiment, the latency and throughput statistics provided by other clients 202 which have played from physically proximate locations are used to further weight the proximity of the CDN to the current location of the current client 202. In one embodiment, latency and throughput measurements are normalized to their means (or medians) and used as a weight, where lower latency and/or higher throughput is more desirable. In one embodiment, the most physically proximate (to the client 202) latency and throughput measurements are used, where physical proximity is bounded by a maximum distance threshold (e.g., 200 meters). In one embodiment the latency and throughput measurements are weighted based on their age and their temporal proximity on a 1 week scale (i.e., a given day of the week, e.g., Monday, is temporally more proximate to other Mondays, though, older Mondays are less temporally proximate than more recent Mondays).

A method, and apparatus such as a workflow management system for performing the method, are described herein for distributing content to a diverse set of mobile client devices, the method including acquiring the content at a server and transforming the acquired content into transformed content having a form suitable for rendering on a plurality of client devices; writing the transformed content to a plurality of content delivery networks; prioritizing the content delivery networks for delivering content to a client; selecting a preferred content delivery network and an alternate content delivery network based on the prioritizing; and providing identifications of the preferred content delivery network and alternative content delivery network to the client to enable the client to retrieve the content therefrom.

With more particularity, the content may be audio/video content. Transforming the content may include transcoding video content into a plurality of different bitrates, frame rates, resolutions, codecs, and container formats.

The content delivery networks can include authoritative content delivery networks receiving the transformed content directly from the server without involvement of any intervening content distribution network. Content may be pushed to an origin server, hosted by one of the content delivery networks, from which the content is distributed to content delivery network edge servers. Alternatively, the origin server may be hosted outside all the content delivery networks, from which a content delivery network may pull the content for distribution to content delivery network edge servers. Permission may be granted to the authoritative content delivery networks to distribute the content to downstream content delivery networks referred to as surrogate content delivery networks. Further permission may be granted to one or more of the surrogate content delivery networks to distribute the content to further downstream content delivery networks referred to as cascaded content delivery networks.

Content requests from client devices may be received via the HTTP protocol, in a local HTTP server. The method may include processing a unique identifier in an HTTP request for the content the client wishes to retrieve. It may additionally include processing location information for the client in an HTTP request for the content the client wishes to retrieve. Processing location information may include gleaning carrier and/or country information from a source network address of the HTTP request, or gleaning carrier, country, and/or cell or router location information from HTTP headers inserted in the HTTP request by a carrier. The method may further include processing device information selected from operating system, screen resolution, protocol support, and codec support in an HTTP request for the content the client wishes to retrieve. The method may further include processing subscriber information in an HTTP request for the content the client wishes to retrieve, which may include gleaning subscriber identification information from HTTP headers inserted into the HTTP request by a carrier, or gleaning subscriber identification information from a source network address of the HTTP request.

Selection of the preferred and alternate content delivery networks may be based first on the availability of compatible content encodings for the client device. Further possibilities include using physical locality, based on geo-location information, as an additional basis for prioritizing of the preferred and alternate content delivery networks; using temporal locality, based on previously reported client retrieval analytics information, as an additional basis for prioritizing of the preferred and alternate content delivery networks; and using business rules pertaining to one or more business-related conditions of service as an additional basis for prioritizing of the preferred and alternate content delivery networks. The business related conditions may be selected from delivery charges and license conditions.

The method may further include receiving and processing content retrieval analytics messages from the client, the content retrieval analytics messages containing information describing performance of either the preferred content delivery network or the alternate content delivery network during retrieval of the content by the client.

Also described herein is a method, and apparatus such as a client device for performing the method, for retrieving content from a plurality of content delivery networks, including acquiring, from a workflow manager, a prioritized list of content delivery networks from which desired content can be retrieved; selecting from the list those content delivery networks having priorities greater than a given threshold; issuing an initial content request to a highest priority content delivery network, and additional content requests to alternate content delivery networks; selecting a best performing content delivery network based on performance information obtained from responses to the initial and additional content requests, and issuing subsequent content requests to the best performing content delivery network; and in the event that a content request issued to the best performing content delivery network fails, selecting a next best performing content delivery network and issuing further content requests to a next best performing content delivery network. The content may be audio/video content.

Content requests may be sent from client devices to the content delivery networks using the HTTP protocol. The content may be retrieved in segments, which may include issuing HTTP range requests to retrieve segments from a large file, or retrieving individual segment files for pre-segmented content.

Selecting the best performing content delivery network may be based on a performance measure including initial response latency, or a performance measure including throughput of content retrieval.

The method may further include reporting performance of each content delivery network to the workflow manager. Statistics reported to the content management system may include initial response latency, content retrieval throughput, geo-location information, and/or timestamp information.

The method may further include, when the content request issued to the best performing content delivery network fails, attempting to retrieve an alternate-bitrate form of the content from the best performing content delivery network.

While various embodiments of the invention have been particularly shown and described, it will be understood by those skilled in the art that various changes in form and details may be made therein without departing from the scope of the invention as defined by the appended claims.

What is claimed is:

1. A method for distributing content to a plurality of client devices, comprising:
receiving, at a server, a playback request from a client device among the plurality of client devices for content;
prioritizing, using the server, a plurality of content delivery networks for delivering content to the client among the plurality of client devices;
selecting, using the server, a preferred content delivery network among the plurality of content delivery networks and an alternate content delivery network among the plurality of content delivery networks based on the prioritizing;
providing, using the server, identifications of the preferred content delivery network and the alternative content delivery network to the client to enable the client to retrieve the content therefrom.

2. The method according to claim 1, further comprising:
acquiring content at the server;
transforming, using the server, the content into transformed content having a form suitable for rendering on a plurality of client devices; and
writing, using the server, the transformed content to a plurality of content delivery networks.

3. The method according to claim 2, wherein the writing further comprises:
writing, using the server, the transformed content to each content delivery network among the plurality of content delivery networks.

4. The method according to claim 2, wherein the writing further comprises:
writing, using the server, the transformed content to a selected content delivery network among the plurality of content delivery networks.

5. The method according to claim 2, wherein the writing further comprises:
writing, using the server, the transformed content to a subset of content delivery networks among the plurality of content delivery networks.

6. The method according to claim 1, wherein the prioritizing further comprises:
prioritizing, using the server, based on feedback from at least one prior client that has requested and retrieved the content, the plurality of content delivery networks.

7. The method according to claim 1, wherein the prioritizing further comprises:
prioritizing, using the server, based on geo-location information provided by the client, the plurality of content delivery networks.

8. The method according to claim 1, wherein the prioritizing further comprises:
prioritizing, using the server, based on measured throughput of the content delivery networks, the plurality of content delivery networks.

9. The method according to claim 1, wherein a first segment of the content is provided from a highest priority content delivery network and a second segment of the content is provided from a second highest priority content delivery network.

10. The method according to claim 1, further comprising:
utilizing, using the user, user information provided by the client to filter content lookup to prevent the client from viewing content for which the user does not have rights.

11. A system for distributing content to a plurality of client devices, comprising:
at least one processor; and
a non-transitory computer-readable storage medium, coupled to the at least one processor, wherein the non-transitory computer-readable storage medium stores computer-readable instructions, when executed by the at least one processor, are configured to:
receive a playback request from a client device among the plurality of client devices for content;
prioritize a plurality of content delivery networks for delivering content to a client among the plurality of client devices,
select a preferred content delivery network among the plurality of content delivery networks and an alternate content delivery network among the plurality of content delivery networks based on the prioritizing, and
provide identifications of the preferred content delivery network and the alternative content delivery network to the client to enable the client to retrieve the content therefrom.

12. The system according to claim 1, wherein the computer-readable instructions are further configured to:
acquire content;
transform the content into transformed content having a form suitable for rendering on a plurality of client devices; and
write the transformed content to a plurality of content delivery networks.

13. The system according to claim 12, wherein the computer-readable instructions are further configured to write the transformed content to each content delivery network among the plurality of content delivery networks.

14. The system according to claim 12, wherein the computer-readable instructions are further configured to write the transformed content to a selected content delivery network among the plurality of content delivery networks.

15. The system according to claim 12, wherein the computer-readable instructions are further configured to write the transformed content to a subset of content delivery networks among the plurality of content delivery networks.

16. The system according to claim 11, wherein the computer-readable instructions are further configured to prioritize, based on feedback from at least one prior client that has requested and retrieved the content, the plurality of content delivery networks.

17. The system according to claim 11, wherein the computer-readable instructions are further configured to prioritize, based on geo-location information provided by the client, the plurality of content delivery networks.

18. The system according to claim 11, wherein the computer-readable instructions are further configured to prioritize, based on measured throughput of the content delivery networks, the plurality of content delivery networks.

19. The system according to claim 11, wherein a first segment of the content is provided from a highest priority content delivery network and a second segment of the content is provided from a second highest priority content delivery network.

20. The system according to claim 11, wherein the computer-readable instructions are further configured to utilize user information provided by the client to filter content lookup to prevent the client from viewing content from which the user does not have rights.

* * * * *